(12) United States Patent
Chen et al.

(10) Patent No.: US 6,481,917 B1
(45) Date of Patent: Nov. 19, 2002

(54) TIE-BOLTLESS SHAFT LOCK-UP MECHANISM

(75) Inventors: Robert P. Chen, Torrance, CA (US); Phil Oyoung, Fullerton, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/562,796

(22) Filed: May 2, 2000

(51) Int. Cl.⁷ .............................. B25G 3/20; F16B 2/14; F16B 2/18; F16B 7/04
(52) U.S. Cl. ................. 403/374.3; 403/355; 403/356; 403/357; 403/358; 403/373; 403/374.3; 403/370; 415/99; 416/244 R; 416/244 A
(58) Field of Search ............................ 403/355, 356, 403/357, 358, 373, 374.3, 370; 415/99; 416/244 R, 244 A

(56) References Cited

U.S. PATENT DOCUMENTS

| | | | |
|---|---|---|---|
| 3,612,719 A | * 10/1971 | Nomura | 416/244 R |
| 3,677,663 A | * 7/1972 | Cronstedt | 416/244 R |
| 3,749,516 A | * 7/1973 | Samurin et al. | 416/244 R |
| 3,758,179 A | 9/1973 | Smith | |
| 3,771,927 A | * 11/1973 | Schiller | 416/244 R |
| 3,804,562 A | 4/1974 | Hansson | |
| 3,807,815 A | 4/1974 | Kasablan | |
| 3,909,085 A | 9/1975 | Wilkinson et al. | |
| 4,011,737 A | * 3/1977 | Kruger et al. | 416/214 A |
| 4,183,719 A | * 1/1980 | Bozung | 416/244 A |
| 4,363,608 A | 12/1982 | Mulders | |
| 4,417,855 A | * 11/1983 | Jepsen | 403/356 X |
| 4,727,762 A | 3/1988 | Hayashi | |
| 4,865,529 A | 9/1989 | Sutton et al. | |
| 4,973,221 A | 11/1990 | Anderson et al. | |
| 5,147,144 A | * 9/1992 | Kasai | 403/356 |
| 5,163,816 A | * 11/1992 | Goetzke et al. | 416/244 A |

* cited by examiner

*Primary Examiner*—Lynne H. Browne
*Assistant Examiner*—John Cottingham
(74) *Attorney, Agent, or Firm*—William J. Zak, Jr., Esq.

(57) ABSTRACT

An apparatus for preventing movement of a wheel on a shaft comprises a nut concentrically disposed on the shaft. A spring is disposed on the shaft and is operatively adjacent to the nut such that the spring can be biased towards the wheel. A first clamping ring is concentrically disposed on the wheel, with the first clamping ring being operatively adjacent the spring. A second clamping ring is operatively adjacent to the side of the wheel that is opposite to the first clamping ring, and a raceway is disposed between the shaft and wheel.

19 Claims, 5 Drawing Sheets

TIE-BOLTLESS SHAFT LOCK-UP MECHANISM

BACKGROUND OF THE INVENTION

This invention relates to pre-loading outer spools for multi-spool rotors. More specifically, the present invention relates to an apparatus and method of locking up a group of parts on a shaft in the absence of a tie-rod for doing so.

A multi-spool rotor can be a series of concentric shafts that can rotate independently of and be controlled independently of one another. Typically, a wheel or other element is attached to the shaft. Reference to a "wheel" is used herein to denote a rotating element on a shaft, such as a turbine, a compressor, or a fan. Reference herein to "locking-up" or "lock-up" is intended to refer to a wheel on a shaft being positionally fixed relative to such shaft so that the radially, axially and/or tangentially directed movement of the wheel is prevented.

A typical approach to locking-up the rotating element on a hollow shaft is to apply a compressive load to the element on the end of the shaft by the use of a threaded rod, or tie-bolt, running through the middle of the shaft. Nuts are then tightened on both ends of the tie-bolt. FIG. 1 shows a prior art tie-bolt shaft lockup apparatus. In this prior apparatus, a tie-bolt 101 extends down the center of a hollow shaft 102. Threaded nuts 103, 104 at the threaded ends 105, 106 of the tie-bolt 101 are tightened by applying torque to the threaded nuts 103, 104. This arrangement completes the "lock-up loads loop" where the hollow shaft and elements are in compression and the tie-bolt is in tension.

However, in this prior apparatus, when a required compressive load is very large, a larger tie-bolt is needed. Also, since there is a limit to the elastic strength of the tie-bolt 101, wheels 107 on a large diameter shaft become harder to lock-up without using an excessively large tie bolt 101. A practical limitation is therefore present on how much compressive force can be achieved. A more important limitation, perhaps, is that the center of the hollow shaft is taken up by the tie-bolt. Consequently, no additional independently rotating shaft can be placed within the space occupied by the tie-bolt.

In related art, Smith (U.S. Pat. No. 3,758,179) shows the use of Belleville disk springs for applying pressure axially to an externally mounted axial mechanical shaft seal. However, the Belleville disk springs are not used for locking-up any items on the shaft, as the seal is placed for the purpose of sealing a rotating shaft. Mulders (U.S. Pat. No. 4,363,608) uses a Belleville disk spring to pre-load an upper bearing in a thrust bearing assembly. In an example given, the Belleville disk spring supplies a positive load of 13,000 pounds. Sutton et al. (U.S. Pat. No. 4,865,529) uses an axial spring to preload a thrust bearing pivot at start-up and shut down of a turbo-pump, which becomes disengaged at high speeds in favor of radial hydrostatic bearings. Kasabian (U.S. Pat. No. 3,807,815) uses Belleville disk springs to provide equal loading on multiple bearings by placing the Belleville disk springs so as to be compressed between the axle mounted bearings. Hansson (U.S. Pat. No. 3,804,562) uses Belleville disk springs to provide axial loading to a rotor. Wilkinson et al. (U.S. Pat. No. 3,909,085) shows the use of either a Belleville disk spring or a corrugated ("wavy") washer for spring loading axially an outer race for ball bearings. None of the above show the use of Belleville disk springs or wavy washers for locking up wheels on a shaft.

Notwithstanding the design barriers, multiple concentric shafts and wheels are useful for overall enhancement of air movement for air cycle machines. Two or more air cycle machines may be used to condition air in an aircraft. In such air cycle machinery, a single shaft may connect two or more wheels such as a turbine, fan or compressor. However, if the air cycle machines are placed in a serial arrangement, the space requirements for the machinery tends to increase linearly. On the other hand, if the air cycle machines can be placed in a concentric configuration, then space savings can be realized. Moreover, the number of part counts will be vastly reduced.

There is a need for an improved apparatus and method of locking up wheels on a shaft. Furthermore, a lock-up apparatus and method for concentric shafts having multiple wheels is not available at this time. Yet another need is for an apparatus and method that eliminates the need for a tie-bolt on at least one outer concentric shaft. Still another need is for an apparatus and method of locking up wheels on a shaft that provides simultaneous locking in the axial, radial and tangential directions.

SUMMARY OF THE INVENTION

The present invention provides an apparatus and method of axially preloading wheels or elements on a hollow shaft by compressive means and without the use of a tie-rod. The invention herein is a method and apparatus for providing pre-load to outer spools of multi-spool rotors, which utilizes only compression members to supply the pre-loads. This invention allows outer spools to be on a concentric hollow shaft.

In one aspect of the present invention, the compression members in the present invention are Belleville disk springs or wavy (corrugated) washers, both of which function as springs. The reference to "Belleville disk springs" refer to those springs manufactured by Associated Spring Corporation and others under the tradename Belleville Spring Washer™. A "wavy washer" is used herein to refer to a wavy or corrugated washer, such as that manufactured by Smalley Steel Ring Company under the tradename Spiralwave™ Wave Spring. Wavy washers are generally preferred over Belleville springs in that, for larger preloading requirements, they take up less axial space than the heavy-duty conical Belleville washers.

In another aspect of the present invention, a threaded nut on each side of the wheel assembly to be locked-up is disposed so that when tightened the threaded nut compresses a Belleville disk spring or wavy washer. The disk spring or wavy washer, in turn, transmits its spring loaded force to a first clamping ring which is disposed adjacent to the threaded nut. The first clamping ring locks-up the wheel assembly and prevents the spring or washer from extending/unraveling in the radial direction. On the other side of the wheel being locked-up, and away from the first clamping ring, is disposed a second clamping ring. A thrust bearing, for example, is disposed next to the second clamping ring. On the side of the thrust bearing away from the second clamping ring, a symmetrically related wheel assembly is disposed and comprises a third clamping ring, a second wheel being locked-up, a fourth clamping ring, a second Belleville disk spring or wavy washer, and a second threaded nut.

Another feature of the present invention is the use of an axially cut raceway (lower), or ball bearing keyway, and an axially cut raceway (upper), or ball bearing keyway, to hold ball bearings between the outer hollow shaft and the wheels attached to the outer shaft. The ball bearings replace a key and a key-way which would otherwise act to prevent transverse relative motion of the wheel and the shaft, i.e., rotational movement of the wheel about the shaft. The raceways, or ball keyways, can be milled to any required precision. The ball bearings, having no edges and corners, are less subject to breakage than the more typical rectangular solid keys. The ball bearings are more easily placed into operative position and with less need for a larger key-way (raceway). This is because the ball bearings roll in and are not subject to the same degree of sliding friction that a rectangular solid key would encounter. The ball keyways and the ball bearings act to prevent the relative motion between the wheel and the shaft in a tangential direction, i.e., tangential to the longitudinal axis of the shaft.

These and other features, aspects and advantages of the present invention will become better understood with reference to the following drawings, description and claims.

DETAILED DESCRIPTION OF THE INVENTION

Figure 1:
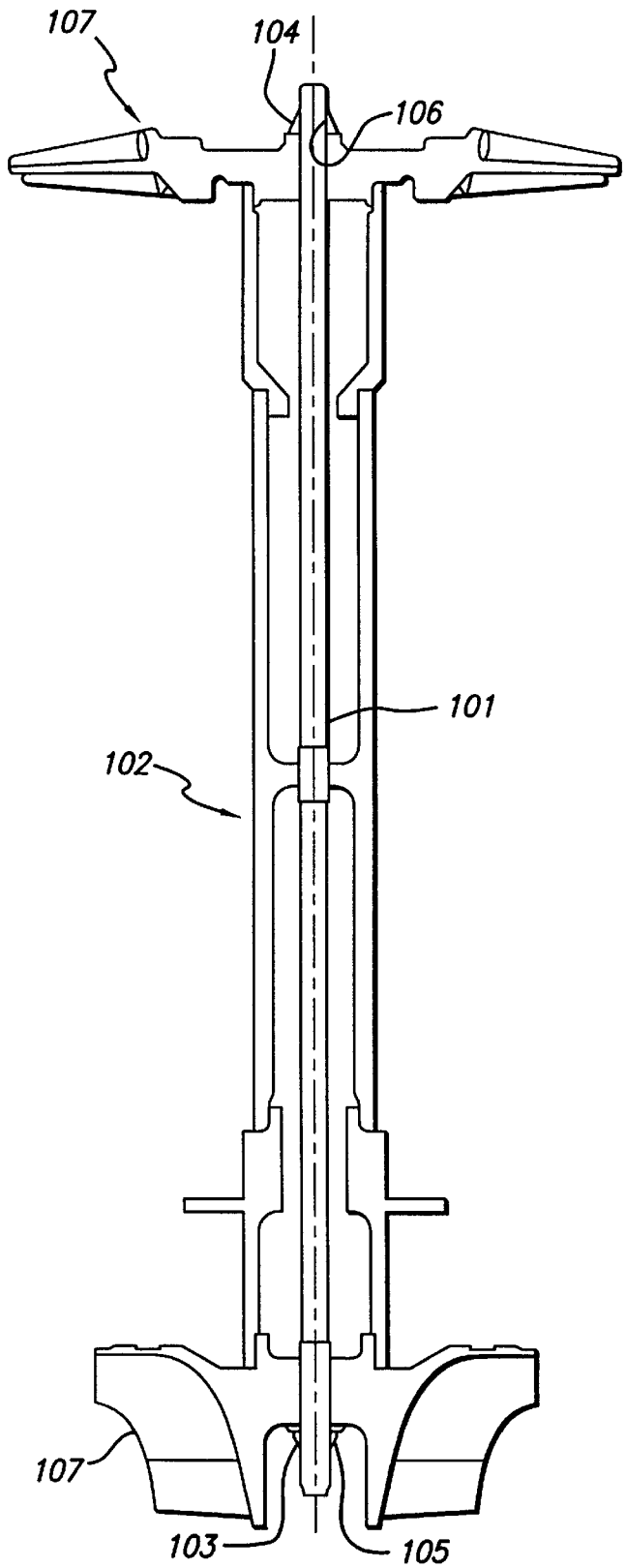
FIG. 1 is a side, cross-sectional schematic view of a prior art tie-bolt shaft lockup.
Figure 2:
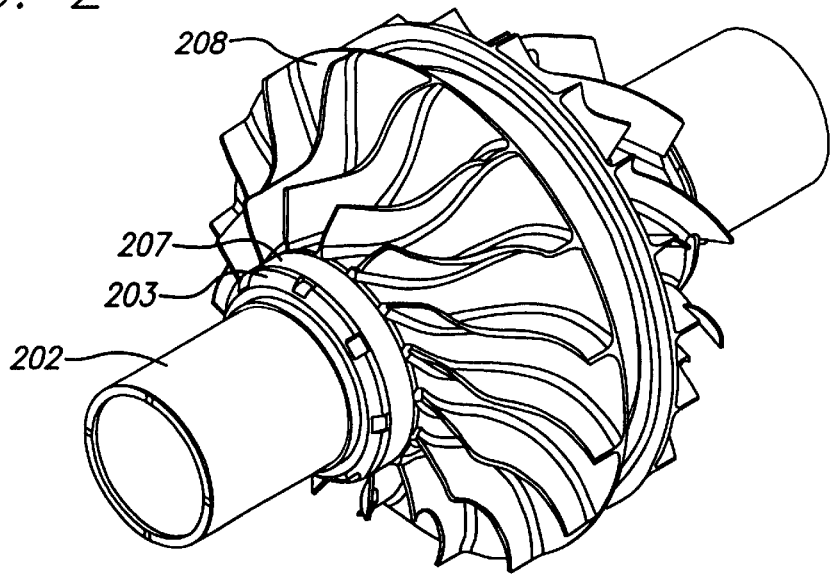
FIG. 2 is a perspective view of the tie-boltless shaft lock-up according to an embodiment of the present invention.

FIG. 2 shows one embodiment of the present invention, the tie-boltless shaft lock-up mechanism. On the outside of a hollow shaft 202 a threaded nut 201 is disposed concentrically around a threaded portion 206 (FIG. 3) of the hollow shaft 202. The threaded nut 201 is tightenable against a spring element 203. In this embodiment, the spring 203 can be a Belleville disk spring or a wavy (i.e., corrugated) washer, and preferably the latter. In either event, the spring 203 is concentrically around the shaft 202 and adjacent a wheel 208 described below. Tightening of the threaded nut 201 biases the spring 203 towards a first clamping ring 207.

Figure 3:
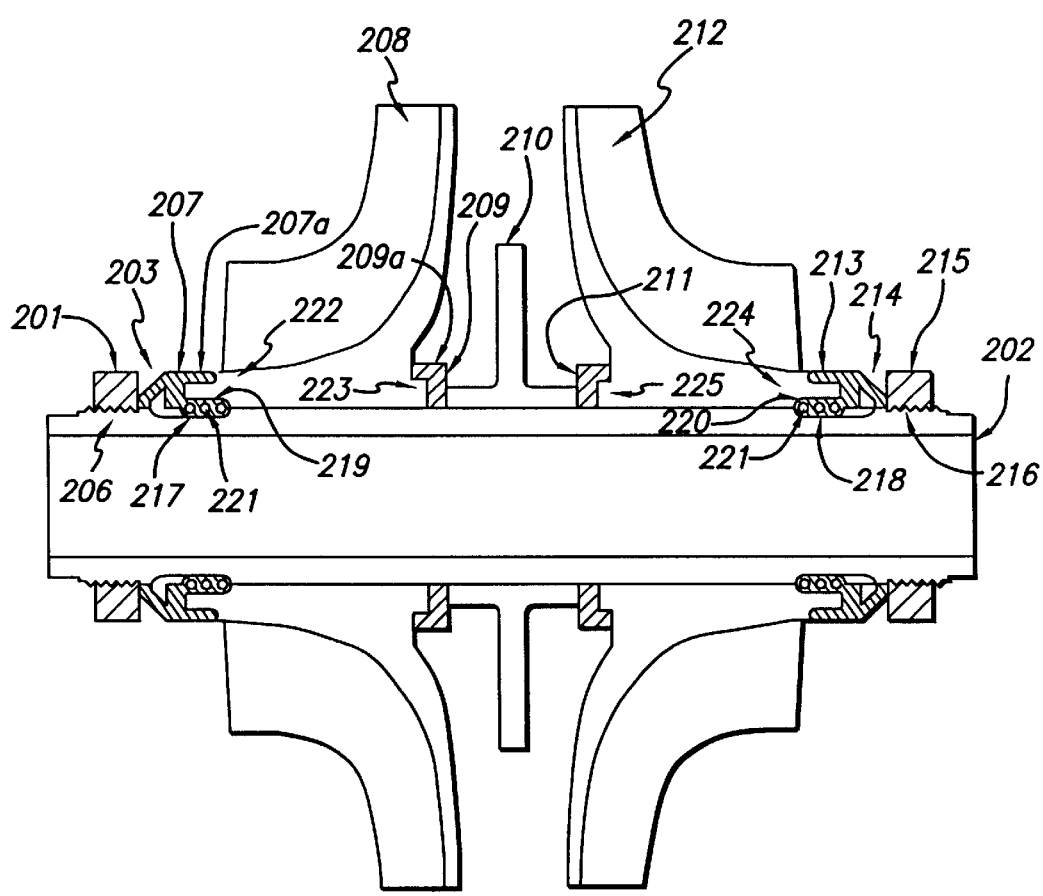
FIG. 3 is a side, cross-sectional schematic view of one embodiment of the tie-boltless shaft lockup shown in FIG. 2.

The first clamping ring 207 is concentric to the shaft 202 and disposed between the spring 203 and an element or wheel 208 to be locked up (e.g., a centrifugal impeller blade and its wheel base). As seen in FIG. 3, the first clamping ring 207 has an L-shaped cross-section. Thus, when the ring 207 is operatively juxtaposed to the wheel 208, a portion of the first ring 207 is on top of the wheel 208 at an edge or shoulder 222 and a portion is axial to such shoulder 222. Thereby, the first clamping ring 207 provides resistance to movement by the wheel 208 in an axial as well as radial direction relative to the shaft 202.

A second clamping ring 209 is configured like the first clamping ring 207. The second clamping ring 209 is disposed between the wheel 208 and another element to be locked up on the hollow shaft 202, for example, a thrust bearing 210. In particular, the second clamping ring 209 is operatively juxtaposed to the wheel 208 on a side opposite the first clamping ring 207. A portion of the second ring 209 is on top of the wheel 208 at an edge or shoulder 223 opposite the first ring 207 and a portion is axial to such shoulder 223. Thereby, the second clamping ring 209 provides resistance to movement by the wheel 208 in an axial as well as radial direction relative to the shaft 202.

A symmetrical design exists on the other side, axially, of the thrust bearing 210. Thus, a third clamping ring 211 (like the second clamping ring 209) is disposed between the thrust bearing 210 and a second wheel 212 at its shoulder 225. The third clamping ring 211 operates and functions similar to the second clamping ring 209. A fourth clamping ring 213 (like the first clamping ring 207) is disposed between the second wheel 212 at its shoulder 224 and a second spring 214 (e.g., a Belleville disk spring or wavy washer). The fourth clamping ring 213 operates and functions similar to the first clamping ring 207). The second spring 214 is biased toward the fourth clamping ring 213 by a second threaded nut 215 concentrically mounted on a second threaded portion 216 of the hollow shaft 202.

An aspect of this invention is that tangential or transverse motion of the wheels, 208, 212 relative to the hollow shaft 202 is inhibited. In other words, rotational slippage of the wheels 208, 212 about the shaft 202 is inhibited as the shaft 202 rotates. This is accomplished by providing axially extending, partial raceways 217, 219 (or keyways for ball bearings acting as keys) between the shaft 202 and the wheel 208. Specifically, the partial raceway 217 is disposed in the shaft 202 and extends axial to the shaft 202. The partial raceway 219 faces opposite to the raceway 217, is disposed in the wheel 208, and extends axial to the shaft 202. In combination, the partial raceway 217 represents one portion of a complete raceway and the partial raceway 219 represents the other portion. Similar axially extending, partial raceways 218, 220 are respectively disposed in the shaft 202 and the wheel 212. The raceway portions 217–220 extend axially along the shaft 202 but not completely circumferentially about the shaft 202. While it is preferred that the depths of the portions of the raceways each correspond to about one-half of the diameter of the keys or ball bearings 221 described below, other depth dimensions can be used. Further, while FIG. 3 depicts two complete raceways 180° apart for each wheel 208, 212, more or less than two raceways can be used and at various angular separations.

A plurality of keys or balls 221 are loaded into the raceway portions 217–220 before the first and fourth clamping rings 207, 214 are placed on the wheels 208, 212. While FIG. 3 depicts three keys 221 in each raceway, more or less than three keys 221 can be used. This method of using ball keyways advantageously allows a more precise control of tolerances in milling the raceways 217–220, as opposed to utilizing more standard keyways and keys. The keyways 217–220 can provide for extra dimensioning in order for the keys to be inserted into and removed from the keyways. Also, keys tend to have points of weakness if they are of a rectangular shape, as for example, corners and edges, which have less material associated with them. On the other hand, and advantageously, the keys 221 are preferably spherical and without corners and edges. Accordingly, the balls 221 and their raceways 217–220 can be machined to closer relative tolerances than the standard keyway and key approach.

In yet a further aspect of this embodiment shown in FIG. 3, and as mentioned above, the wheel 208 has shoulders 222 and 223 disposed at opposing sides or edges. Similarly, the wheel 212 has shoulders 224 and 225. The shoulders 222 and 224 act with the respective clamping rings 207 and 213 to provide axial and radial stabilization for the wheels 208 and 212. The other shoulders 223 and 225 act together with clamping rings 209 and 211, respectively, to also provide additional stabilization for the wheels 208 and 212. Additionally, if a spring 203 undergoes catastrophic failure, the axial directed extensions 207a and 209a of the respective clamping rings 207 and 209 are dimensioned and arranged such that at least part of the extensions 207a, 209a remain in contact with the wheel shoulders 222 and 223. Thus, a failure mode advantageously exists. A similar arrangement and function exist for the clamping rings 211 and 213 having axial directed extensions 211a and 213a.

Figure 4:
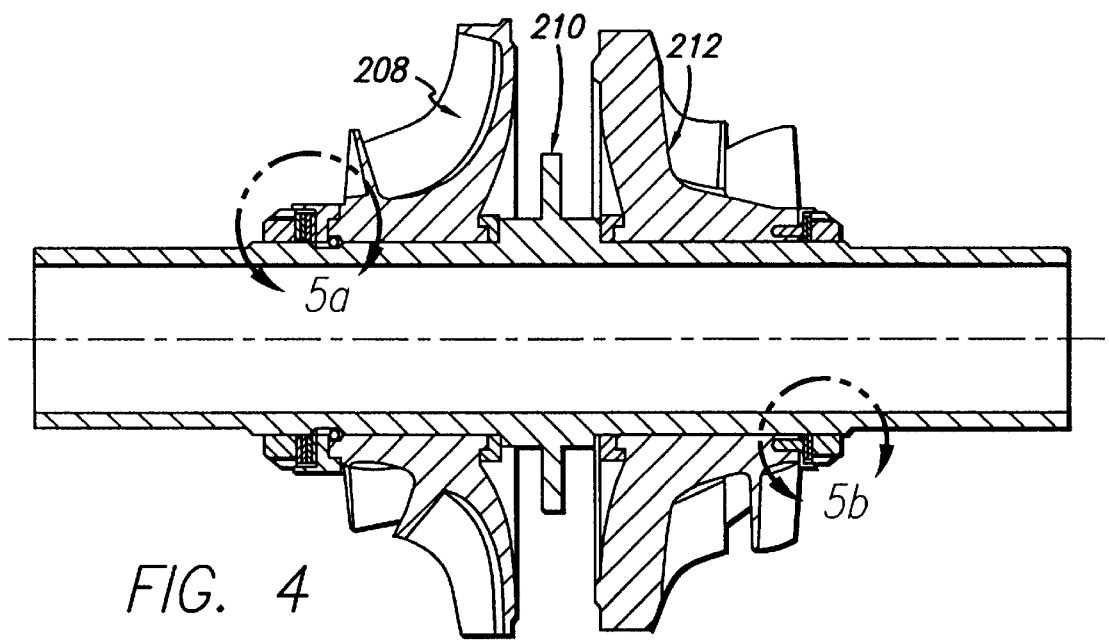
FIG. 4 is a side, cross-sectional schematic view of another embodiment of the present invention.
Figure 5A:
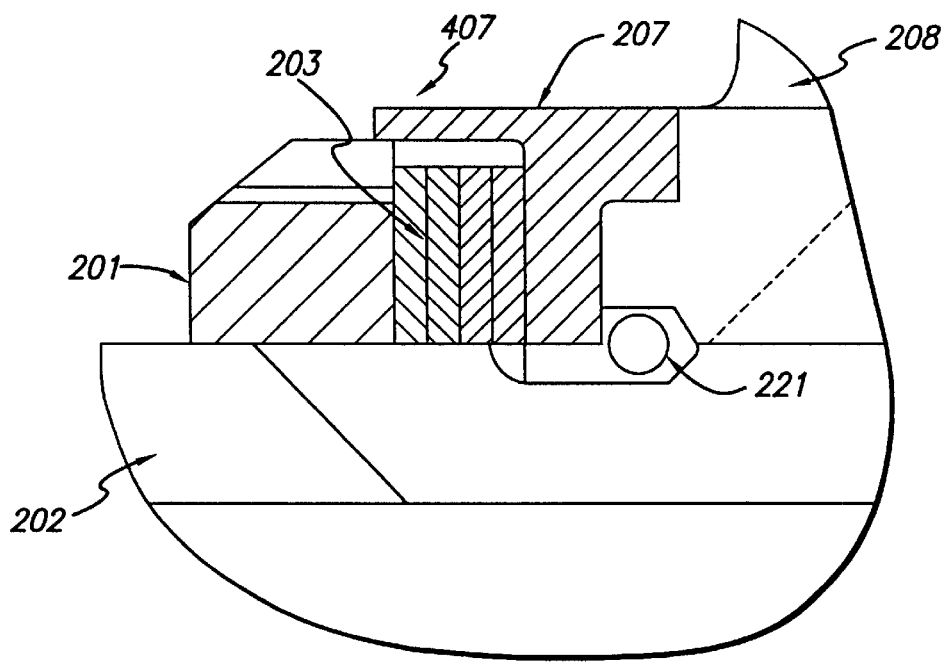
FIG. 5a shows the detail of one aspect of the embodiment of the invention shown in FIG. 4, which includes an overhang on the clamping ring.

FIG. 4 shows another embodiment of the present invention that is similar to the above-described embodiment. However, in this second embodiment, there are at least two differences. In one different aspect, the first clamping ring 207 includes an overhang portion 407 (FIG. 5a) that axially extends towards the threaded nut 201, providing protection for the spring 203. Therefore, the spring 203 is protected from impact damage. Also, the overhang 407 prevents the spring 203 from unraveling, which might occur when the shaft 202 is rotating at high speed.

Figure 5B:
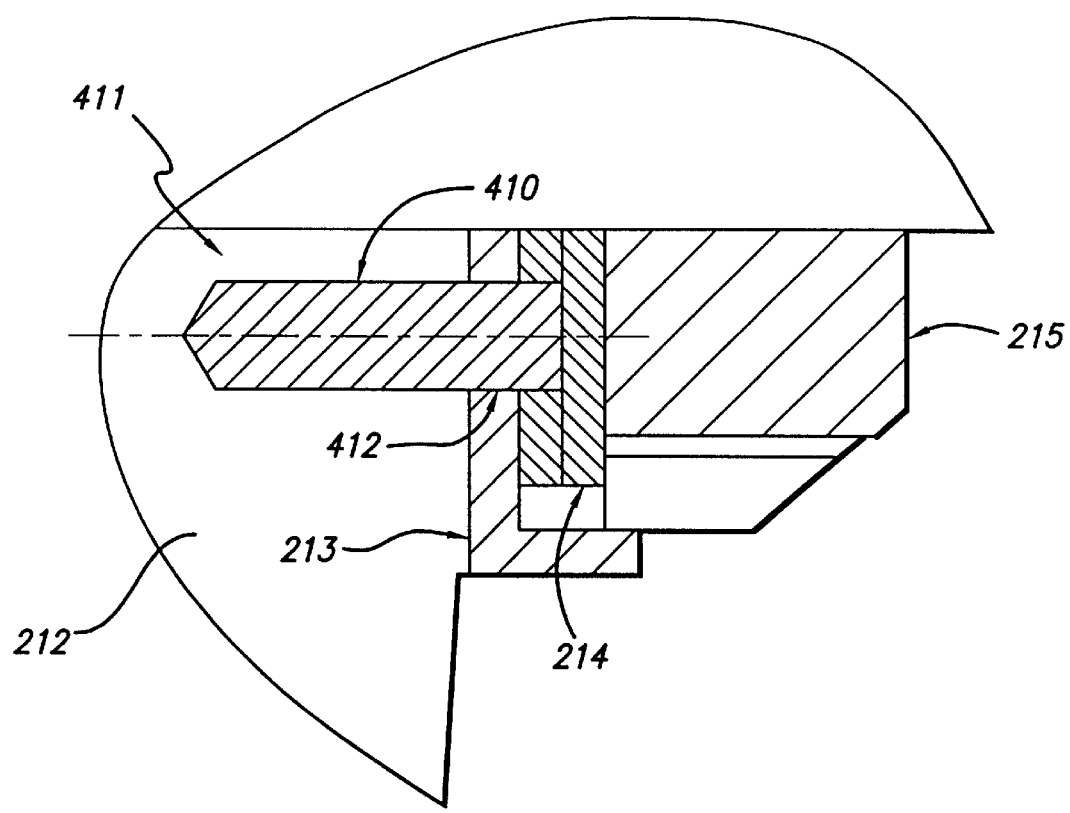
FIG. 5b shows the detail of another aspect of the embodiment of the invention shown in FIG. 4, which includes pins extending through the wheel and clamping ring.

A second different aspect in the second embodiment is shown in detail in FIG. 5b. A pin 410 is disposed so as to extend through a wheel hole 411 in the wheel 212. The pin 410 also extends through a ring hole 412 in the clamping ring 213 and one layer of the wavy washer 214. One or more pins 410 may be used. This aspect provides additional prevention of tangentially directed motion under the lock-up conditions between the clamping ring 213, the wheel 212, and the wavy washer.

Figure 6:
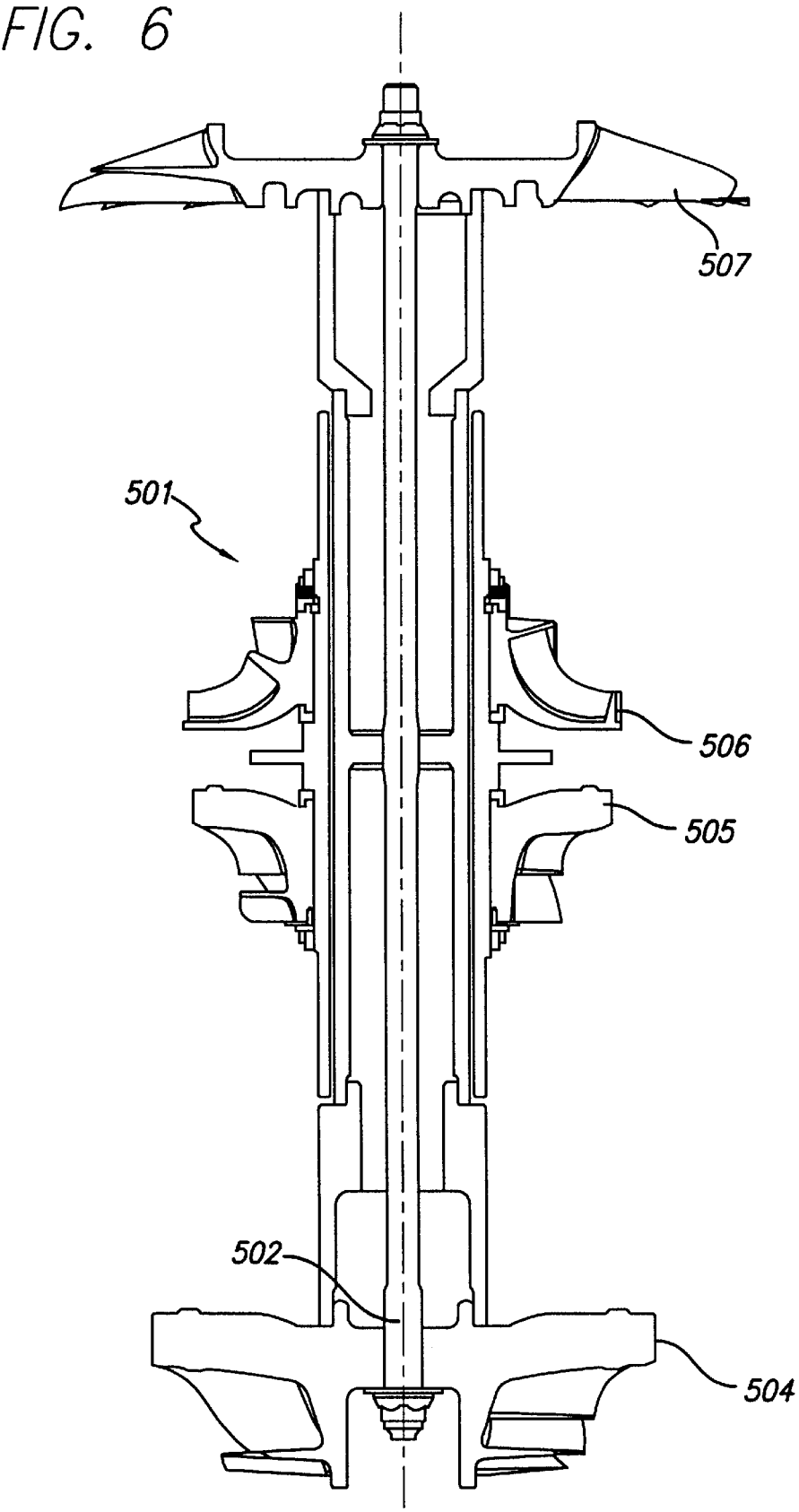
FIG. 6 is a side, cross-sectional schematic view of two concentric shafts with the center shaft having a tie-bolt according to an embodiment of the present invention.

FIG. 6 shows the application of the tie-boltless shaft lock-up method and apparatus to an air cycle machine 501. There is a tie-bolt type internal shaft, which locks up wheels 504 and 507. A separate hollow shaft that is concentric to the internal shaft 503 locks up wheels 505 and 506 with aspects of the embodiments described above. No tie-bolt is used to lock up the wheels on the outer rotatable concentric shaft.

It can be seen that the present invention provides a method of locking up wheels on a shaft in the absence of a tie-bolt. The present method applies axially directed pressure from at least one side of a wheel to achieve balanced axial load that provides the strong Frictional binding of the wheel independent of the other wheel on the opposite side. Additional aspects of this method include one or more methods for applying a keying-type feature to provide a lock-up.

The method of this invention applies compressive forces using a compressive spring 203, 214 to lock up and pre-load rotating devices on a shaft 202, in particular a hollow shaft 202. Unlike other approaches, this method does not use any of the space inside the hollow shaft 202. Compressive forces originate from tightening a threaded bolt against the springs 203, 214 which compress the springs 203, 214 against a wheel to be pre-loaded and locked-up. Clamping rings 207, 209, 211, 213 are used as part of the lock-up compressive method. They transmit the pressure of the compressive springs 203, 214 to the wheels 208, 212 including their shoulders 223–225. In addition, to help keep the wheels locked-up, a key in the form a ball bearing or bearings 221 are rolled into keyways or raceways 217, 219, the latter of which reside in the base of the wheel 208 and the former of which resides in the wall of the hollow shaft 202. Also, pins 410 can be used to lock-up the wheels and clamping rings.

Specifically, the method of the present invention includes moving a first nut 201 disposed on the shaft 202, with the movement being towards the first wheel 208. The first nut 201 then contacts the first spring 203. The first spring 203 is consequently biased towards a first side of the first wheel 208. The first clamping ring is disposed at the first side of the first wheel 208. Thereby, radially and axially directed movement of the first wheel is prevented.

The method of the present invention further includes disposing a second clamping ring 209 at a second side of the first wheel 208, with the second side being opposite to the first side. The second clamping ring 209 is operatively adjacent the second side of the first wheel 208. The raceway portions 217–219 are preferably provided between the shaft 202 and the wheels 208, 212. For each complete raceway, one raceway portion is in the shaft 202 and another portion is in a wheel 208 or 212. The first clamping ring 207 is oriented to cover an exposed end of the complete raceway. The first clamping ring 207 is also mateably or lightly shrink-fitted to the shoulder 222 of the first wheel 208.

In the event the first clamping ring 207 includes an overhang portion, the overhang portion is juxtaposed to the first spring 203. In the event the first clamping ring includes a ring hole 412 and the first wheel 208 includes a wheel hole 411, the pin 410 is inserted through the holes.

As can be appreciated by those skilled in the art, the present invention provides a lock-up apparatus and method wherein two sets of wheels can rotate independently of one another in a single unit. The invention also allows for shaft-lockup on large diameter hollow shafts, which makes it feasible to implement air bearings for heavy machinery. Also provided by the present invention is an apparatus and method for the outer shaft of concentric shafts to have its respective wheels to be locked-up in radial, axial, and tangential directions relative to the shafts. By eliminating the need for a tie-bolt on an outer shaft of concentric shafts, the present invention enhances the space utilization for the outer shaft to the extent that two machines can occupy the same space with slightly increased axial length and unlimited diametral increase.

It should be understood, of course, that the foregoing relates to preferred embodiments of the invention and that modifications may be made without departing from the spirit and scope of the invention as set forth in the following claims.

We claim:

1. A method of preventing movement of a first wheel on a shaft without the use of a tie-bolt, comprising:
   moving a first nut disposed on said shaft, said moving being towards said wheel;
   contacting said first nut with a first spring disposed on said shaft;
   biasing said first spring towards a first side of said first wheel;
   disposing a first clamping ring at said first side of said first wheel;
   disposing a second clamping ring at a second side of said first wheel, said second side being opposite to said first side;
   whereby radially and axially directed movement of said first wheel is prevented.

2. The method of claim 1, further comprising providing a raceway between said shaft and first wheel.

3. The method of claim 2, wherein said raceway extends axially to said shaft.

4. The method of claim 2, wherein providing a raceway comprises:

provide one raceway portion in said shaft; and providing another raceway portion in said first wheel.

5. The method of claim 2, further comprising:

covering an exposed end of said raceway with said first clamping ring.

6. The method of claim 1, wherein said first wheel comprises a shoulder and said method further comprises:

mateably fitting said first clamping ring to said shoulder.

7. The method of claim 1, wherein said first clamping ring comprises an overhang portion and said method further comprises:

juxtaposing said overhang portion to said first spring.

8. The method of claim 1, wherein said first wheel comprises a wheel hole, said first clamping ring comprises a ring hole, and said method further comprises:

inserting a pin through said wheel hole and ring hole.

9. An apparatus for preventing movement of a wheel on a shaft, comprising:

a nut concentrically disposed on said shaft;

a spring disposed on said shaft and operatively adjacent to said nut such that said spring can be biased towards said wheel;

a first clamping ring concentrically disposed on said shaft, said first clamping ring being operatively adjacent said spring; and a second clamping ring disposed adjacent a side of said wheel that is opposite to said another side of said wheel to which said first clamping ring is adjacent.

10. The apparatus of claim 9, wherein said spring is a Belleville disk spring.

11. The apparatus of claim 9, wherein said spring is a wavy washer.

12. The apparatus of claim 9, further comprising:

a raceway disposed between said shaft and wheel; and keys disposed in said raceway.

13. An apparatus for preventing movement of a wheel on a shaft, comprising:

a nut concentrically disposed on said shaft;

a spring disposed on said shaft and operatively adjacent to said nut such that said spring can be biased towards said wheel;

a first clamping ring concentrically disposed on said wheel, said first clamping ring being operatively adjacent said spring;

a second clamping ring operatively adjacent a side of said wheel that is opposite said first clamping ring; and a raceway disposed between said shaft and wheel.

14. The apparatus of claim 13, wherein said spring is concentrically disposed to said shaft.

15. The apparatus of claim 13, wherein said spring can be biased towards a side of said wheel that is opposite said second clamping ring.

16. The apparatus of claim 13, wherein said first and second clamping rings have an L-shaped cross-section.

17. The apparatus of claim 13, wherein said wheel comprises a pair of shoulders that mateably fit to said first and second clamping rings.

18. The apparatus of claim 13, wherein said first clamping ring comprises an overhang portion that interfaces said spring.

19. The apparatus of claim 13, further comprising:

a wheel hole disposed in said wheel;

a ring hole disposed in said first clamping ring; and a pin extending through said wheel and ring holes.

* * * * *